(12) United States Patent
Tamstorf et al.

(10) Patent No.: US 8,681,145 B2
(45) Date of Patent: Mar. 25, 2014

(54) ATTRIBUTE TRANSFER BETWEEN COMPUTER MODELS INCLUDING IDENTIFYING ISOMORPHIC REGIONS IN POLYGONAL MESHES

(75) Inventors: Rasmus P. Tamstorf, Los Angeles, CA (US); Michael T. Goodrich, Irvine, CA (US); David Eppstein, Irvine, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1126 days.

(21) Appl. No.: 12/408,317

(22) Filed: Mar. 20, 2009

(65) Prior Publication Data

US 2010/0238166 A1 Sep. 23, 2010

(51) Int. Cl.
*G06T 15/00* (2011.01)
(52) U.S. Cl.
USPC ............ 345/419; 345/423; 345/581; 345/619
(58) Field of Classification Search
USPC .......................................... 703/2; 706/12; 1/1
See application file for complete search history.

(56) References Cited

U.S. PATENT DOCUMENTS

| | | | |
|---|---|---|---|
| 6,323,863 B1 * | 11/2001 | Shinagawa et al. ........... | 345/441 |
| 6,356,263 B2 | 3/2002 | Migdal et al. | |
| 6,782,130 B2 | 8/2004 | Guo | |
| 7,304,647 B2 | 12/2007 | Hong et al. | |
| 2002/0042697 A1 | 4/2002 | Yamada et al. | |
| 2003/0078758 A1 * | 4/2003 | Hariya et al. ..................... | 703/2 |
| 2006/0136398 A1 * | 6/2006 | Suomi et al. ..................... | 707/3 |
| 2006/0195419 A1 * | 8/2006 | Tenma et al. ..................... | 707/2 |
| 2007/0018993 A1 | 1/2007 | Levene et al. | |

OTHER PUBLICATIONS

Masaki Hilaga, Yoshihisa Shinagawa, Taku Kohmura, and Tosiyasu L. Kunii. 2001. Topology matching for fully automatic similarity estimation of 3D shapes. In Proceedings of the 28th annual conference on Computer graphics and interactive techniques (SIGGRAPH '01). ACM, New York, NY, USA, 203-212. DOI=10.1145/383259. 383282 http://doi.acm.org/10.1145/38.*
Siu-Wing Cheng and Antoine Vigneron. 2002. Motorcycle graphs and straight skeletons. In Proceedings of the thirteenth annual ACM-SIAM symposium on Discrete algorithms (SODA '02). Society for Industrial and Applied Mathematics, Philadelphia, PA, USA, 156-165.*

* cited by examiner

*Primary Examiner* — Phi Hoang
(74) *Attorney, Agent, or Firm* — Marsh Fischmann & Breyfogle, LLP; Kent A. Lembke

(57) ABSTRACT

A method for automatically transferring attributes between computer-generated models. The method includes storing in memory first and second models represented by polygonal meshes and storing a set of attributes for the first model. A processor operates or runs a compressed graph generator to process the first and second models to generate first and second compressed graphs that are compressed versions of the models. The method includes comparing topological connectivity of the first and second compressed graphs. When the connectivity is similar, the method includes transferring at least a portion of the attributes from the first model to the second model. The compressed graphs may be motorcycle graphs, skeleton graphs, or other forms of compressed graphs. The method includes determining a pair of vertices in the first compressed graph that match vertices in the second compressed graph for use as starting locations in comparing topological connectivity of the compressed graphs.

17 Claims, 6 Drawing Sheets

ATTRIBUTE TRANSFER BETWEEN COMPUTER MODELS INCLUDING IDENTIFYING ISOMORPHIC REGIONS IN POLYGONAL MESHES

BACKGROUND OF THE INVENTION

1. Field of the Invention

The present invention relates, in general, to computer animation, and, more particularly, to systems and methods for allowing efficient production of computer generated (CG) or computer-animated images by accurately determining similarities and differences between two animation models to enable transfer of attributes from one to another model.

2. Relevant Background

Computer animation has become a standard component in the digital production process for animated works such as animated films, television animated shows, video games, and works that combine live action with animation. The rapid growth in this type of animation has been made possible by the significant advances in computer graphics software and hardware that is utilized by animators to create CG images. Producing computer animation generally involves modeling, rigging, animation, and rendering. First, the characters, elements, and environments used in the computer animations are modeled. Second, the modeled virtual actors and scene elements can be attached to the motion skeletons that are used to animate them by techniques called rigging. Third, computer animation techniques are performed ranging from key framing animation where start and end positions are specified for all objects in a sequence to motion capture where all positions are fed to the objects directly from live actors whose motions are being digitized. Fourth, computer rendering is performed to visually represent the animated models with the aid of a simulated camera.

A model of a complex object or character may require hundreds or thousands of polygons to provide a desired level of detail in 3D space. In many applications, polygonal meshes such as quadrilateral meshes are used to provide these models or representations of 3D objects or characters. During animation processes, attributes are assigned to the models, and the attributes such as shading, texturing, and other animation or rendering information may be assigned to the model based on an area or polygon-basis or associated with each vertex. To improve efficiency of the animation process, a model of an object may be simultaneously used by a number of departments to create a final model for use in rendering of a CG image or an animated scene. For example, the original model may be used by a shading department and a layout department concurrently while the model may also be undergoing rigging to allow the model to be moved or animated. As a result, a number of models may be generated that each have differing attributes.

It is often desirable to later transfer attributes from one model to another model such as transferring shading attributes for one model to another model that has been rigged to a skeleton for motion. Unfortunately, attribute transfer algorithms are typically only effective when the two models have similar shape or topological connectivity (e.g., there are two basic approaches to attribute transfer, with one being based on the geometric shape of an object and the other being based on the topological connectivity). Additionally, each of the departments or animators working on an original model may have introduced dissimilarities that cause the attribute transfer algorithm to fail or terminate without completing the transfer. Often, the transfer module will simply report back to the operator that the two models are not identical or the same without providing any indication of where the difference was found. An animator may look at the two models and not be able to visualize the difference because the model may have hundreds or thousands of mesh faces or areas with just one difference resulting in failure to transfer the attributes or rendering information. As a result, the animator may be forced to recreate a model or to perform numerous manual steps that result in an animation project becoming very tedious or labor intensive and expensive. The need for identifying similar models can be seen in many animation projects where many similar characters or objects are used in the same scene and it is desirable to transfer attributes rapidly to the numerous copies, which may be in various positions but otherwise similar. The same object may also be modeled and used in numerous scenes of an animated work, and it is desirable to transfer attributes among models used in these varying scenes even if one model has been worked on by numerous animation personnel or departments.

Hence, there is an ongoing need for computer-based methods and systems for determining whether two animation models that have been generated and stored in memory are similar enough to enable attribute transfer to be successfully completed. Further, it would be desirable for the computer-based methods and systems to be configured to output or report areas of any identified differences or dissimilarities when two copies of models do not match.

SUMMARY OF THE INVENTION

The present invention addresses the above problems by providing attribute transfer methods and systems for use with computer generated or animated models such as those represented with polygonal meshes such as, but not limited to, quadrilateral meshes. The methods and systems include algorithms or techniques for creating compressed graphs of the meshes including motorcycle graphs and skeleton graphs. The methods also may automate the identification of anchor vertices (or pairs of vertices that match in each of two meshes or models), which in prior practices was a tedious manual process, and this anchor identification may include labeling of vertices based on emanating edges, finding a unique label in one model/compressed graph, and then finding a match in the other model/compressed graph. The methods of the invention further include comparing topological connectivity of two models, such as by using the compressed graphs and starting at the identified anchor vertices.

When the comparison indicates similarity in connectivity, attributes such as attributes associated with faces, edges, or vertices of a polygonal mesh (or data useful in rendering or the like) is transferred from one model (e.g., a source) to the other matching model (e.g., a target). Interestingly, if the comparison indicates at least some dissimilarity or mismatch in connectivity, the methods described herein may include performing an approximate topological matching to identify regions or areas of the two models that do match or have similar connectivity and to also, in some cases, identify regions or areas of the two models that do not match or that have dissimilar connectivity (e.g., areas that may have been changed during parallel processing of a model). This approximation may include using a lazy-greedy comparison or matching algorithm to compare two compressed versions of the models (e.g., skeleton or other compressed graphs) starting from identified anchor vertices. The methods and systems of the invention recognize that producing a maximum or best-case approximate topological match of two meshes may be NP-hard (or nearly impossible), but the lazy-greedy algorithm provided here produces good matches especially when mismatching portions of the meshes are localized in the models.

More particularly, a computer-based method is provided for transferring attributes between animated models. The method includes storing or providing in memory a first computer animated or CG model and a second computer animated model that both comprise a polygonal mesh. The memory is also used to store a set of attributes (e.g., data, properties, or other information) for at least the first model (e.g., data associated with vertices, edges, and/or faces of the mesh). A processor operates or runs a compressed graph generator to process the first and second models to generate first and second compressed graphs that are compressed versions of the first and second models (e.g., the compressed graphs may each have fewer vertices than the number found in their corresponding original mesh or model). Note, the compression step is primarily an acceleration technique, and the subsequent labeling, anchor identification, and transfer work faster with such compression but may also be performed without compression in some embodiments of the method. The method continues with the processor acting to compare topological connectivity of the first and second compressed graphs. When the compared connectivity is similar, the method may include transferring at least a portion of the attributes from the first model to the second model. As defined herein, the compressed graphs may be motorcycle graphs, skeleton graphs, or other forms of compressed graphs or compressed versions/copies of the original mesh.

The method may also include determining a pair of vertices (e.g., anchors) in the first compressed graph that match a pair of vertices in the second compressed graph, and these pairs may be used as starting locations or anchors in the step of comparing the topological connectivity of the compressed graphs. Such anchor identification is automated or performed by the processor running a module/routine/algorithm that may function to label vertices of the compressed graphs (e.g., based on emanating edges or otherwise), selecting a uniquely labeled vertex in the first compressed graph, finding a match in the second compressed graph, and then choosing a neighboring vertex to make a pair or a set of anchors. In some aspects of the invention, the compared topological connectivity may be at least partially dissimilar, and the method may further include operating the compressed graph generator to create skeleton graphs of the two original meshes (if not already completed) and then using the anchors to apply a lazy-greedy algorithm to perform approximate topological matching of the first and second models. The output of such approximate topological matching may be a set of matching regions and a set of nonmatching regions (e.g., areas of similar topological connectivity and areas of dissimilar topological connectivity or at least areas marked/identified as being dissimilar by the lazy-greedy algorithm). Then, the method may include transferring some or all of the attributes from the first model to the second in the set of matching regions of the models.

According to another aspect of the invention, code or logic readable by a computer may be provided on disk or other digital data storage device or medium. The code may cause a computer to effect retrieving first and second meshes from memory for first and second models and to effect generating compressed graphs of the first and second meshes. The code may also cause the computer to effect identifying a pair of vertices in the compressed graph of the first mesh that matches a pair of vertices in the compressed graph of the second mesh. Further, code may cause the computer to effect comparing topological connectivity of the compressed graphs starting at the pairs of vertices to identify regions in the compressed graphs with matching connectivity. Code may be provided to cause the computer to effect transferring attributes from one of the first and second models to the other one of the models, with the attributes being associated with regions identified as having matching connectivity. The comparing of the topological connectivity may include identifying regions in the compressed graphs with dissimilarity in the topological connectivity.

DETAILED DESCRIPTION OF PREFERRED EMBODIMENTS

Briefly, embodiments of the present invention are directed to methods and systems for facilitating the transfer of attributes, such as information or data useful in rendering or other animation processes, from one animation or computer graphics (CG) model to another. The methods and systems described address the broad problem of transferring attributes between two models stored in memory (e.g., transfer attributes associated with faces, edges, and/or vertices from a source model to a target model). The method is a computer-based or fully automated method that functions to compare two input models such as a model with polygonal meshes (e.g., quadrilateral or other meshes) to determine if they have identical topological connectivity. To make such a comparison more efficient, compressed graphs are first formed and these compressed graphs are tested for similarity. The method may also include processes to automate the location of starting points or anchor vertices for use in performing the similarity testing or comparison and/or for use in attribute transfer. Once full or partial connectivity similarity is determined or verified, the pair of starting or anchor vertices (e.g., one (or more) labeled or identified vertex in each model or compressed graph of such model) may be input to an attribute transfer module that then acts to transfer attributes from the source to the target model by working through all the neighboring and matching vertices of the mesh of the model. If the comparison shows that the two models are not identical, the method may involve creating a skeleton or other compressed graph of the two models and then performing an approximate topological matching with these compressed graphs to identify portions or regions of the models that have matching connectivity and regions that are nonmatching. Attributes can be transferred in an automated fashion to the matching regions, and the nonmatching regions may be identified to an operator or reported in output of the transfer method.

The following description begins with an overview of a computer system or work station that may be used to implement or practice the attribute transfer method and then discusses generally the attribute transfer method of the invention. This discussion is followed by a detailed description of implementations of compressed graph generators as well as algorithms for comparing connectivity, for providing approximate topological matching, and for identifying useful anchors or starting vertices for attribute transfer.

Figure 1:
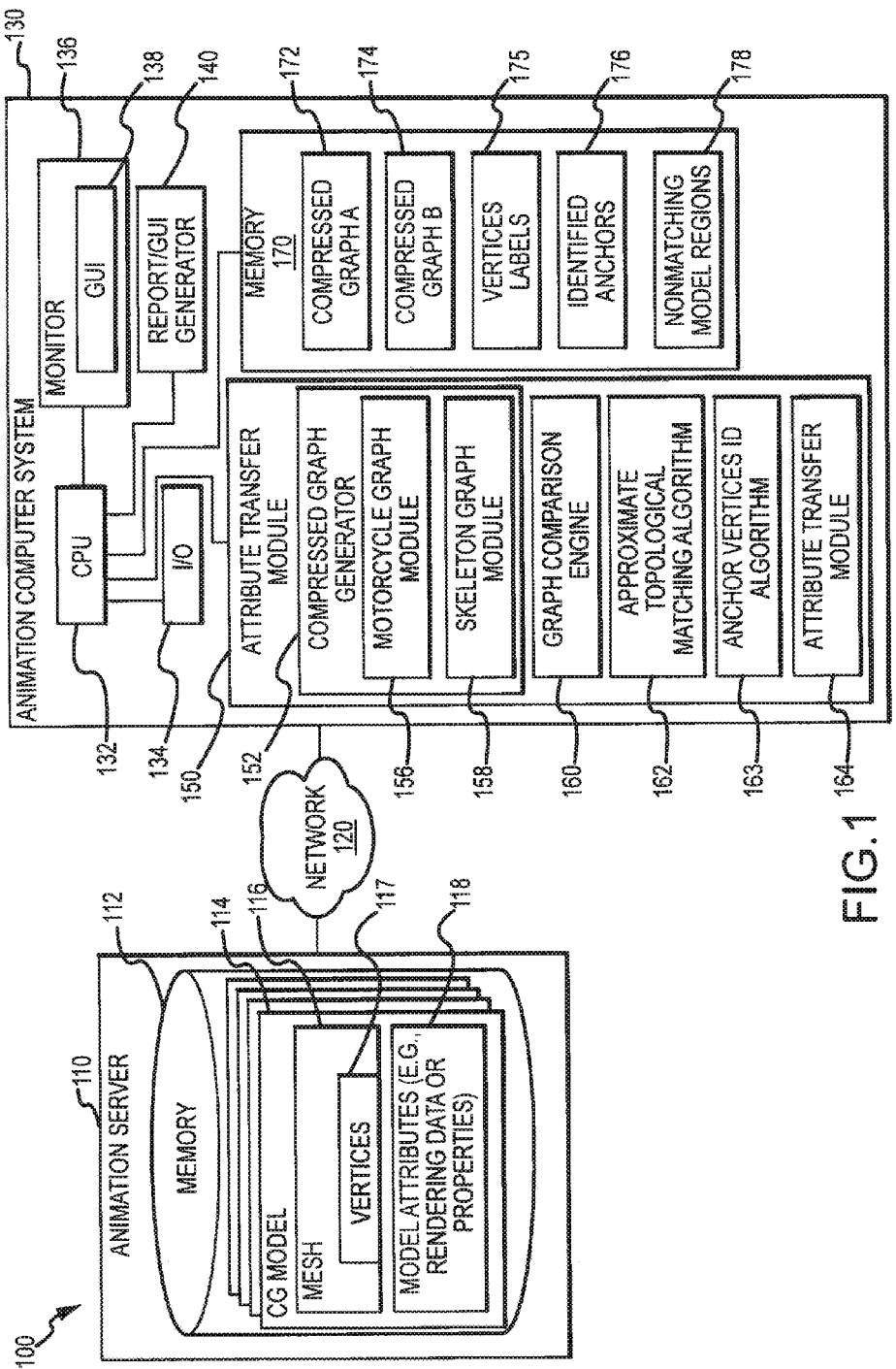
FIG. 1 is a functional block diagram a computer system or network configured for use in transferring attributes such as rendering or other animation-related data or information from one model to another model with similar or matching topological connectivity.

FIG. 1 illustrates an attribute transfer system 100 of an embodiment of the invention that includes a server 110 linked by a digital communications network 120 (such as a local area network (LAN), a wide area network (WAN), the Internet, or the other digital communications connection) to an animation computer system 130. The server 110 and computer system 130 may take many forms to practice the invention such as conventional servers and a variety of computer devices such as desktop computers, computing workstations, laptops, notebooks, and the like including other electronic devices configured to provide processing, memory, and other data storage and computing functions such as devices adapted to support computer graphics processes as common in the animation industry.

Further, the functions and features of the invention are described as being performed, in some cases, by "modules" (or "engines" or "algorithms"), and these modules may be implemented as software running on a computing device and/or firmware, hardware, and/or a combination thereof. For example, the data attribute transfer method, processes, and/or functions described herein and including creation of compressed graphs of CG models or quadrilateral meshes and comparison of the topological connectivity of such compressed graphs may be performed by one or more processors or CPUs running software modules or programs. The methods or processes performed by each module are described in detail below typically with reference to functional block diagrams, flow charts, and/or data/system flow diagrams that highlight the steps that may be performed by subroutines or algorithms when a computer or computing device runs code or programs to implement the functionality of embodiments of the invention. Further, to practice the invention, the computer, network, and data storage devices and systems (or memory) may be any devices useful for providing the described functions, including well-known data processing and storage and communication devices and systems such as computer devices or nodes typically used in computer systems or networks with processing, memory, and input/output components, and server devices (e.g., web servers and the like) configured to generate and transmit digital data over a communications network. Data typically is communicated in a wired or wireless manner over digital communications networks such as the Internet, intranets, or the like (which may be represented in some figures simply as connecting lines and/or arrows representing data flow over such networks or more directly between two or more devices or modules) such as in digital format following standard communication and transfer protocols such as TCP/IP protocols.

Figure 3:
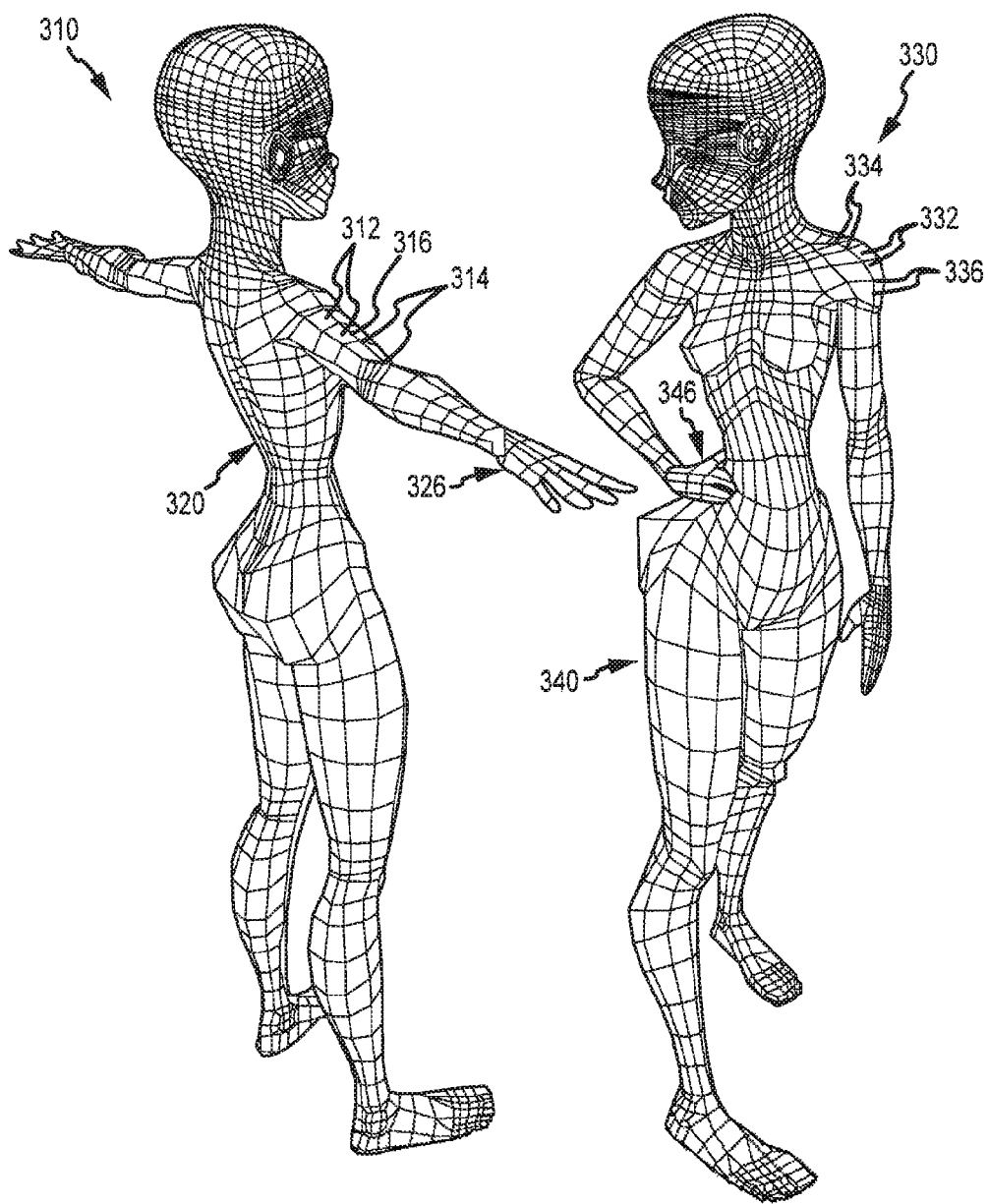
FIG. 3 illustrates a pair of CG or animation models in the form of quadrilateral meshes that may be compared according to the invention for similarity of topological connectivity and as may be displayed in an output or report indicating matching and nonmatching regions based on such comparison.

In the system 100, a server or data storage device 110 is provided on the network 120 (or otherwise accessible by computer system 130). The server 110 serves data stored in memory or data store 112 including information or data that is stored during an animation project for example but not limitation. For example, the memory 112 may be used to store numerous animation or CG models 114 for objects or characters that are being animated for inclusion in an animated film or the like. In many cases, the CG models 114 are each represented by or include a mesh 116 (e.g., a polygonal mesh such as, but not limited to, a quadrilateral mesh) defined by the arrangement of numerous vertices 117 (and edges between such vertices 117). For example, FIG. 3 illustrates a pair of CG models 310, 330 defined in part with quadrilateral meshes 320, 340. Associated with each of the CG models 114, model attributes 118 may be stored in memory 112 such as data and properties for use in animating an object or character, e.g., data for use in later rendering processes.

The CG models 114 are typically created by a number of modelers or other operators of one or more animation/modeling (or other) computer systems, computers, or workstations 130 that are in communication with the memory 112 via network 120 (or more directly). The computer system 130 includes a central processing unit (CPU) 132 that runs or controls input and output devices 134 (e.g., keyboards, mice, touch screens, voice recognition devices, and the like) as well as a monitor 136 that may be operated to view the CG models 114 and/or to allow an operator to enter input and/or interact with an attribute transfer module 150 and other programs/routines running on or accessed by the system 130. The CPU 132 may also manage or run a report and graphical user interface (GUI) generator 140 that creates the GUI 138 and may be used to create reports or output of the attribute transfer module 150 and/or to print such reports out or transmit the reports via network 120 or otherwise (e.g., in an e-mail or the like).

Significantly, the computer system 130 includes an attribute transfer module 150 that can be run to assist an operator in testing two models 114 for similarity and when at least partial similarity is found, in transferring all or portions of the model attributes 118 from a source one of the models to a target one of the models. To this end, the attribute transfer module 150 includes a compressed graph generator 152 that may be called by an operator via the GUI 138 or otherwise to create a compressed version or graph of one the models 114. For example, a pair of models 114 may have been processed by the compressed graph generator 152 to generate compressed graphs 172, 174 that are stored in system memory 170.

A variety of techniques may be used to create compressed graphs or versions of the models 114 with the goal being to reduce processing (e.g., similarity testing) time between the compressed versions 172, 174, and, generally, this means that the compressed versions 172, 174 include a subset of the vertices 117 of the meshes 116 (with quadrilateral meshes shown in FIG. 1 as one non-limiting example) of the models 114. As will be described in more detail below, the generator 152 may use a motorcycle graph module 156 to form compressed graphs 172, 174 in the form of motorcycle graphs or may use a skeleton graph module 158 to form the compressed graphs 172, 174 in the form of skeleton graphs, with the choice often depending upon whether the compressed graph is required or preferred to be canonical (e.g., then a motorcycle graph may be preferred) or if some risk of error is acceptable (e.g., then a skeleton graph may be used).

The attribute transfer module 150 further includes a graph comparison engine 160 that functions to compare two compressed graphs or versions of models 114 such as graphs 172, 174 to determine if the connectivity is identical. This may involve providing a pair of vertices (one from each compressed graph) to the algorithm, which then may act to compare neighboring vertices in an iterative process to determine if connectivity is similar in the two compressed graphs 172, 174. Alternatively, an anchor vertices ID algorithm 163 may be run to identify and/or recommend anchors or starting point vertices 176 for the connectivity comparison by comparison engine 160. This may involve, as discussed below, creating unique labels 175 for the vertices. For example, the number of emanating edges from a vertex may be used as its label 175 and a second step may be concatenation of the labels of all neighboring vertices followed by selecting a concatenation with a smallest value. A matching value in the other compressed graph may indicate a vertex that can be paired to create a pair of anchors or starting vertices 176 for initiating connectivity comparison (and/or attribute transfer).

In some cases, the graph comparison engine 160 may determine that the two graphs 172, 174 (and the corresponding models 114) do not have similar topological connectivity. In such cases, an approximate topological matching algorithm 162 (such as a lazy-greedy algorithm as discussed below or other approximate matching algorithm) may be run on the compressed graphs 172, 174, which may be formed as skeleton graphs to facilitate proper operation of the matching algorithm 162. The approximate topological matching algorithm 162 may be selected to identify matching regions as well as nonmatching model regions 178 that may be stored in memory 170 and reported to a user. The attribute transfer module 150 is further shown to include an attribute transfer module 164 that may be called upon determination that two models 114 are matching based on similar topological connectivity of their compressed graphs 172, 174. At this point, the identified anchors 176 or other starting point vertices (e.g., typically a pair is provided from each model for use in attribute transfer by module 164) may be provided to the attribute transfer module 164 that acts to transfer the properties or model attributes 118 from one of the models 114 identified as a source to one of the models 114 identified as the target to create a new or revised model 114 (e.g., CG, animation, or other model) with revised attributes 118 (e.g., for corresponding vertices, edges, and faces the properties of the source are transferred to the target in an iterative, automated process).

Figure 2:
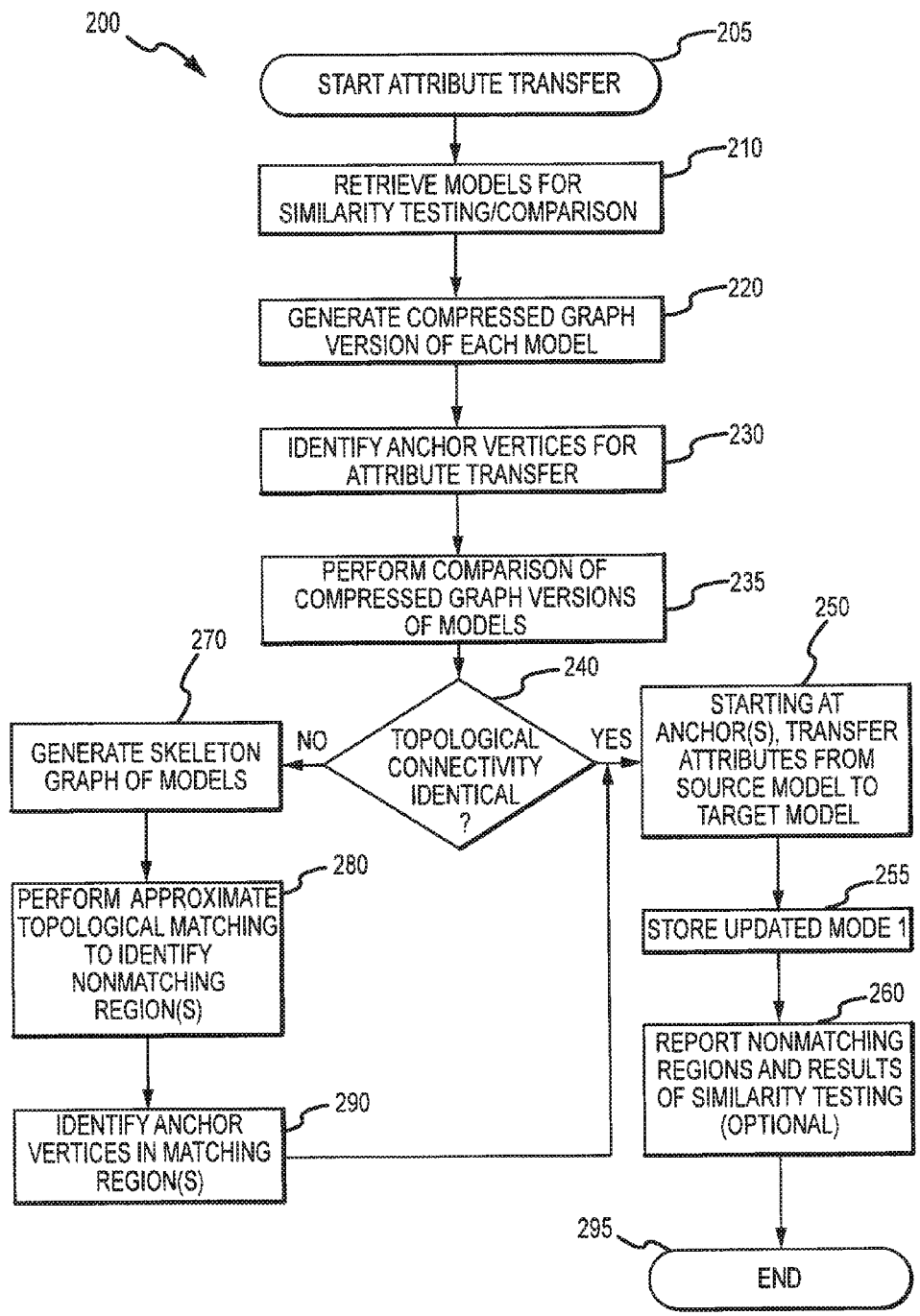
FIG. 2 is a flow chart of a method of transferring attributes from one model to another that includes identifying regions with like or similar topological connectivity as well as nonmatching or dissimilar regions.

FIG. 2 illustrates a representative attribute transfer method 200 such as may be performed by operation of the system 100 of FIG. 1 or other systems. As shown, the method 200 starts at 205 such as by providing a set of animation models or meshes used to represent objects or characters. Step 205 typically may also include loading software tools such as the attribute transfer module 150 shown in FIG. 1 onto operator computers (or providing these operators with access to such tools). This may also include a selection of which subset of available algorithms will be used in various processing steps or this selection may be left to an operator (e.g., a selection of whether to create compressed graphs such as motorcycle graphs or skeleton graphs and a selection of techniques/tools for identifying anchor pairs, for comparing topological connectivity, for approximating topological matching if pairs of models differ in connectivity, for transferring attribute data, and so on).

Figures 5A, 5B:
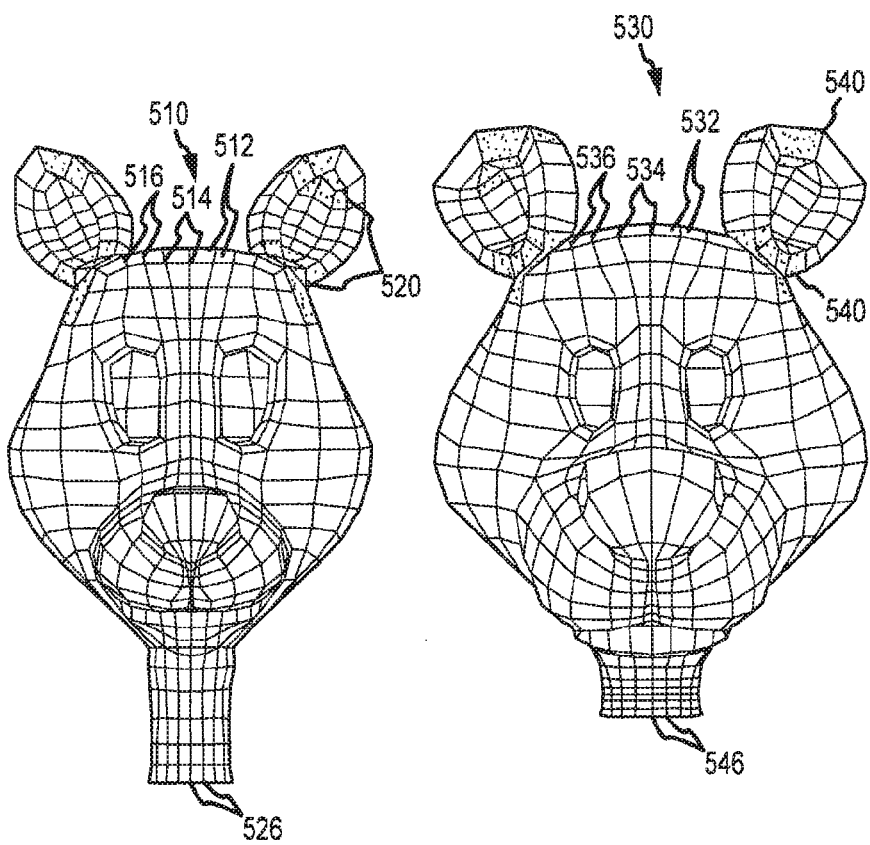
FIGS. 5A and 5B illustrate another pair of CG or animation models that have been compared for topological connectivity similarity according to an embodiment of the invention showing nonmatching regions, which would be difficult to find without use of the invention, and such as may be provided in a GUI display or a report to an animator or operator.

The method 200 continues at 210 with retrieving a pair of models for similarity testing or connectivity comparison (e.g., choosing two models from memory or data storage). For example, an operator may wish to compare the two CG models 310, 330 shown in FIG. 3 or the two CG models 510, 530 shown in FIGS. 5A and 5B. As shown, models 310, 330 are provided as quadrilateral meshes 320, 340 with numerous faces or quadrilaterals 312, 332 defined by vertices 314, 334 and edges 316, 336 extending therebetween. Likewise, models 510, 530 are polygonal meshes (e.g., quadrilateral meshes or the like) with numerous faces 512, 532 defined by vertices 514, 534 and edges 516, 536. As will be appreciated, it is very difficult to determine by visual inspection whether the meshes have similar topological connectivity, and, for illustration purposes, the models 310 and 510 are chosen to differ slightly from models 330, 530 with the nonmatching region or areas shown as shaded areas or regions 326, 346, 520, 540 (e.g., region 326 does not match region 346 and region 520 is dissimilar from region 540) while the rest of the models do match.

Figure 4:
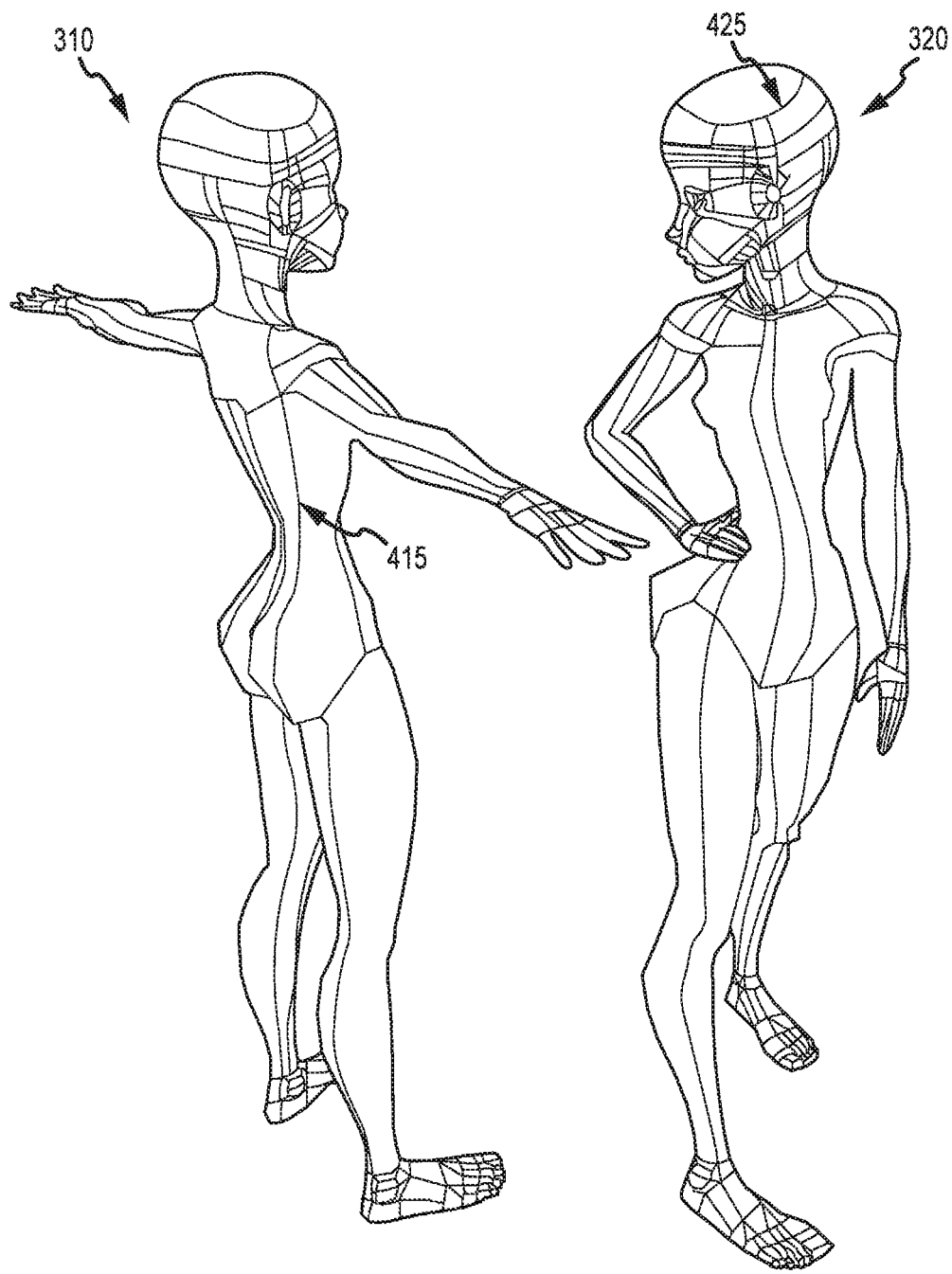
FIG. 4 illustrates the pair of CG or animation models of FIG. 3 in the compressed graph form showing the significant reduction in vertices, edges, and quadrilaterals provided by compression techniques such as a motorcycle graphing process.

The method 200 continues at 220 with generating a compressed version of each model. For example, the compressed graph generator 152 of FIG. 1 may be called and the motorcycle graph module 156 run on models 310 and 330 to generate compressed versions or graphs as shown in FIG. 4 with motorcycle graphs 415, 425 for models 310, 320. As can be seen, the motorcycle graphs 415, 425 have significantly fewer vertices (and edges and faces), which facilitates similarity testing and/or connectivity comparison. As will be discussed below, motorcycle graphs are desirable as compressed graphs because they have been proven to provide an accurate indication of whether two quadrilateral or other polygonal meshes are similar (i.e., if the topological connectivity of two motorcycle graphs is found to be identical then the connectivity of the meshes are also identical).

At 230, anchors or starting point vertices may be identified in each of the models (such as by labeling or other techniques as discussed herein). At 235, the method 200 continues with performing a comparison of the connectivity of the compressed graph versions of the two models of interest. For example, this may involve an iterative comparison process starting at the anchors and working outward to neighboring vertices to determine if the connectivity at each of these neighbors is similar in both models. For example, such a comparison may be performed of models 510 and 530 by starting at anchor or starting point vertices 526 and 546 (or another anchor pair) and may proceed upward until a mismatch is identified in regions 520 when compared with regions 540. At 240, the method 200 continues with a determination of whether the results of the comparison 235 indicate that the topological connectivity is similar throughout the compressed graphs. If so, the method 200 continues at 250 with transferring the attributes from the source model to the target model (such as from model 310 to 330 or vice versa), and such transfer may start at the anchors or other identified starting points/vertices. At 255, the updated model is stored in memory and/or passed to other processes for further modification or processing (e.g., to a renderer or the like). At 260, the method 200 may include reporting any nonmatching regions (such as regions 326, 346) and/or results of the similarity testing such as indicating the models had similar topological connectivity or providing a percent or fractional similarity (e.g., "the models had 60 percent similarity and attributes were transferred to that portion" or the like). The method 200 then ends at 295.

When at 240 it is determined that the connectivity of the two models was not identical, the method 200 continues at 270 with generating a skeleton graph or other compressed graph that is useful for processing when connectivity is not identical. At 280, the method includes performing approximate topological matching to identify nonmatching regions, and this may include using the lazy-greedy algorithm for the tool 162 of FIG. 1, with this technique described in detail below. At 290, anchor vertices may be identified or these may be from step 230. It may be desirable to continue with transferring of the attributes from the matching portion of the source model to the matching portion of the target model (e.g., to all areas except the nonmatching model regions such as regions 520 and 540 of FIGS. 5A and 5B). The method 200 then continues with performance of steps 250, 255, and 260 and ends at 295.

With the above discussion of an attribute transfer system and method in mind, it may now be useful to describe in more detail specific aspects and/or embodiments of the invention including how to generate compressed graphs or compressed versions of animation models. Specifically, the following discussion provides a description of algorithms, which may be implemented within the compressed graph generator 152 of FIG. 1, to partition unstructured quadrilateral meshes into multiple structured submeshes such as a canonical partition based on the motorcycle graphing technique. The discussion then shows how such a compressed graph in the form of a motorcycle graph can be used to efficiently find isomorphisms between the meshes and also discusses how such a canonical partition may be constructed or generated in sublinear or reduced time when the set of extraordinary vertices of a model or its mesh is known (e.g., compression as described significantly increases efficiency in storing model versions for comparison and also the actual process of testing similarity of topological connectivity). Also, a description is provided of techniques for further reducing the number of components of a structured partition of a mesh. As will be shown, although optimization of the number of components may be very difficult (e.g., NP-hard), heuristics can be used to approximate a reduced or minimum number of such components. The term canonical is used in this context to indicate that for any particular quadrilateral mesh there is only one motorcycle graph, e.g., use of the motorcycle graph technique provides canonical compression of models because if you have two meshes and they have the same connectivity the result or output will be the same compression or compressed graph.

Quadrilateral meshes have many applications in computer graphics, surface modeling, and finite element simulation, and any of these applications may provide the animation or CG models discussed herein. The polygon meshes of a model may be quadrilateral meshes, and the simplest quadrilateral meshes are structured meshes in which connections between quadrilaterals form a regular grid. However, in complicated domains, it may be necessary to use meshes in which this structure is interrupted by a small number of irregular vertices that do not have degree four. For example, mesh generation methods may replace each quadrilateral of a coarse unstructured quadrilateral mesh with a finer structured mesh, and, with such methods, flaws may occur at the coarse mesh vertices. Similar domain decomposition-based meshing techniques have been studied, and in these techniques, the initial coarse mesh partitions the finished mesh into structured submeshes. However, subsequent processing steps may cause the knowledge of the partition to be lost. Alternatively, meshing methods may be used in CG modeling that do not form structured submeshes within each subdomain or that are not based on domain decomposition. Even for a repartitioned mesh, it may be possible to repartition the mesh into structured submeshes in multiple ways. The use of a motorcycle graph provides one technique of generating a compressed graph of a given mesh (e.g., an unstructured quadrilateral mesh) or model by providing a partition with a small number of structured submeshes.

There are a number of motivations for providing an improved (e.g., reduced complexity and canonical) compressed graph of a CG model or partition of a quadrilateral mesh or other polygonal mesh. For example, as discussed for use in computer animation, similarity testing between two models stored in memory or worked on in parallel is very important and useful to allow attributes to be transferred between the models. Hence, as a specific example of algorithmic increased efficiency on compressed meshes, the following discussion considers testing of the similarity between pairs of object represented or modeled as quadrilateral meshes. For instance, the objects may represent two copies of a model within a scene, and by finding an isomorphism from one copy to another, rendering information such as texture maps or other attributes may be shared. For models of bounded genus, isomorphism testing may be performed in linear time, but these algorithms are complex and may have a high constant factor in their linear runtime. In contrast, by applying these same tests to a compressed version of the model rather than the uncompressed input model, the speed of such isomorphism testing is significantly increased without sacrificing accuracy or robustness. In addition, compression of a mesh to a motorcycle graph allows certain features of the mesh such as distances between irregular vertices to become more salient, which leads to better performance from the isomorphism algorithms. Also, as discussed below, the compressed representations or graphs described herein may also be used in approximate similarity testing in which one mesh may differ by a relatively small amount with respect to another and in which the task is to find the large portions of the two meshes that remain identically connected (e.g., regions or portions of the models with matching connectivity).

Other applications for an enhanced compressed graph or version of a mesh include texture mapping, mesh compression, algorithms on compressed meshes, and scientific computation. Texture mapping is a standard technique in graphics whereby a two-dimensional bitmap image is projected onto the faces of a three-dimensional model. A partition into submeshes provides a convenient framework for describing the correspondence between two-dimensional pixels and three-dimensional vertices, e.g., one can store a separate bitmap image for each submesh and map each submesh quadrilateral vertex to the corresponding pixel in the bitmap. A partition with few submeshes minimizes the overhead associated with the bitmap objects and reduces visual artifacts at the seams between submeshes. With regard to mesh compression, a partition of an unstructured mesh into structured submeshes can be used as a compressed representation of the mesh that may be substantially more space efficient than the original uncompressed mesh. With meshes with few flaws, the compressed size of the mesh topology (e.g., in a motorcycle graph) is proportional to the small number of irregular vertices. Much of the emphasis in this application regards mesh topology, but it may also be used in compressing the mesh geometry as the techniques of the invention provide a structured neighborhood of each vertex that could be used in predicting vertex positions from their neighbors.

Regarding algorithms on compressed meshes, several efficient algorithms in image and video processing, graph algorithms, and text searching apply directly to the compressed data rather than needing to uncompress the data before processing it. Such techniques can often be made to run in an amount of time proportional only to the compressed data size, and the compressed graphs or representations of unstructured mesh via its partition into structured submeshes (e.g., into a motorcycle graph) may be helpful in finding similar solutions to algorithmic problems on meshes. Regarding scientific computation, in finite element computations on quadrilateral grids, the code for looping over mesh elements and computing their updated simulation values can be greatly simplified and sped up when the mesh is structured. By partitioning unstructured meshes into a small number of structured submeshes and using a code structure in which an update cycle includes an outer loop over submeshes and an inner tight loop over the elements within each submesh, it should be possible to achieve similar speed ups while allowing less structured meshes that may be easier to generate or that may better fit the domain structure.

Through theoretical development, it has been shown that the method for generating compressed graphs or partitions using the motorcycle graph technique is canonical in the sense that it does not depend on the ordering in which the mesh elements are stored but only on the connectivity of the initial mesh or model. Such a canonical partition is of particular interest with regard to the mesh isomorphism problem because it allows isomorphisms to be found (e.g., match regions) between meshes in an amount of time that depends on the compressed size of the mesh rather than on its overall number of elements. The following description also provides data that shows that on meshes from animation applications the canonical partition or compressed graph leads to a substantial reduction in storage size compared to the initial unpartitioned mesh or model. The described canonical partition or compression may also be constructed in certain cases in time that is sublinear in the input. Specifically, if the initial list of irregular vertices in a mesh is given, the partition or compressed graph can be constructed in time that is proportional to the number of boundary edges in the mesh, which may be a substantially smaller number than the number of edges in the entire input mesh. Also, regarding problems of finding partitions that are optimal in the sense of minimizing the size of the compressed representation of the mesh, it can be shown that many problems of this type are NP-complete, but the canonical partition approximates them to within a constant factor. Further, heuristics can be used for reducing the size of compressed representations beyond the size provided by our canonical partition.

At this point in the discussion, it may be useful to discuss some of the terms used in the description of the canonical partition or generation of a compressed graph of a mesh representation of a modeled object or character. An abstract quadrilateral mesh is a structure $(V, E, Q)$, where $V$ is a set of vertices, $E$ is a set of edges, and $Q$ is a set of quadrilaterals. The mesh or its structure has the following properties: (a) $V$, $E$, $Q$ are finite; (b) $(V, E)$ forms a simple undirected graph, e.g., each edge includes an unordered pair of distinct vertices, no two edges connect the same pair of vertices, and, if an edge $e$ is formed by the pair $\{v, w\}$, $v$ and $w$ are called the endpoints of $E$; (c) each quadrilateral in $Q$ includes an oriented cycle of four edges in the graph $(V, E)$; (d) each edge in $E$ belongs to at least one, and at most two, quadrilaterals in $Q$; (e) any two quadrilaterals in $Q$ intersect in a single edge, a single vertex, or the empty set; (f) if two quadrilaterals intersect in a single edge $\{u, v\}$, then that edge is oriented from u to v in one of the two corresponding two cycles of four edges and from v to u in the other cycle; and (g) if two quadrilaterals q and q' intersect in a single vertex v, there is a sequence of quadrilaterals $q=q_0, q_1, \ldots q_k=q'$ such that each pair $q_i, q_i+1$ of consecutive quadrilaterals in the sequence intersects in an edge that has v as its endpoint.

The boundary of a quadrilateral mesh includes all edges of E that belong to exactly one quadrilateral of Q, and all vertices incident to an edge of this type. In graphics and scientific simulation applications, the vertices correspond to points in space, but that correspondence is not required for the algorithms described here. A submesh of a quadrilateral mesh $M=(V, E, Q)$ is a mesh $M'=(V', E', Q')$ and a one-to-one mapping from $Q'$ to $Q$, such that whenever any two quadrilaterals of $Q'$ intersect in an edge, the corresponding quadrilaterals of $Q$ also intersect in an edge. Further, whenever any two quadrilaterals of $Q'$ intersect in a vertex, the corresponding quadrilaterals of $Q$ intersect in at least a vertex. A submesh can be formed by cutting apart $Q$ along a set of edges corresponding to the boundary edges of $Q'$ and keeping a connected component of the result. An ordinary vertex of a quadrilateral mesh is a non-boundary vertex incident with exactly four edges of the mesh or a boundary vertex incident with at most three edges. An extraordinary vertex is a vertex that is not ordinary. A mesh or submesh is structured if it has no extraordinary vertices and unstructured otherwise. As will become clear, a main emphasis of the compression techniques described herein is the partition of quadrilaterals of a mesh $M=(V, F, Q)$ into a small number of subsets $Q_1, Q_2, \ldots$, such that each $Q_i$ is the set of quadrilaterals in a structured submesh of M, and such a partition or compressed graph may be labeled a structured partition of M.

Regarding the classification of structured meshes, variable a and b may be positive integers. Then, an (a, b)-grid may be said to be the structured mesh formed by the unit squares with integer vertex coordinates within the rectangle $\{(x, y) | 0 \leq x \leq a$ and $0 \leq y \leq b\}$. Two meshes are isomorphic if there is a one-to-one correspondence between their vertices, edges, and quadrilaterals, preserving all incidences between pairs of objects. A first lemma may be stated that if M is a structured mesh, then the manifold formed by M is homeomorphic to a disk, an annulus (i.e., a disk with a single hole in it), or a torus. Further, if M forms a disk, it is isomorphic to an (a, b)-grid.

In representing a structured partition, a schematic partition may be thought of as a graph or multigraph (e.g., a compressed graph) that is embedded on a two-dimensional manifold without boundary. Such a schematic partition may have the following properties: (a) each edge is marked with a length; (b) some of the vertex-face intersections are marked as corners; (c) each vertex has at least two incident edges such that if a vertex has exactly two incident edges then exactly one of its vertex-face intersections is marked as a corner; (d) each face of the embedding is topologically a disk and has either zero or four corners: (e) at least one of the two faces incident to each edge has four corners; and (f) if a face has four corners, then these corners partition the boundary of the face into four paths such that the two paths in each opposite pair of paths have the same length.

It may be convenient to represent schematic partitions using a winged edged data structure made up of an object for each edge with pointers to the four edges clockwise and counterclockwise from it on each incident face. To augment this data structure to describe a schematic partition, a length may be stored in memory for each edge object, and two bits representing the existence of a corner at the two vertex-face intersections clockwise of the edge on each of its two incident faces. Then, mesh M may be said to have a structured partition $Q_1, Q_2, \ldots Q_k$ into structured submeshes, each topologically a disk. From this partition, a schematic partition may be formed representing M by letting X be the set of vertices of M that have nonzero deficiency in M itself or in at least one submesh $Q_i$. Then, Y can be decomposed into a family of paths in M, having vertices in X as endpoints. A schematic partition is formed with one edge per path that is labeled by the length of the path. Conversely, from a schematic partition formed in this way from a quadrilateral mesh M, a mesh isomorphic to M can be formed by replacing each marked face of G, having paths connecting its corners with lengths a, b, a, b, by an isomorphic copy of an (a, b)-grid. In this sense, a schematic partition can be thought of as a compressed graph or representation of M, requiring space proportional to the number of edges in G rather than to the number of vertices, edges, and quadrilaterals or faces in M. In one specific example, a schematic partition (or one form of a compressed graph) of a quadrilateral mesh having 323 vertices, 622 edges, and 300 quadrilaterals may take the form of a winged edge data structure having only 44 edge objects.

Significantly, compressed graphs or partitions may be generated using a motorcycle graph technique (e.g., as may be implemented in the compressed graph generator 152 to perform the process 200 of FIG. 2). Specifically, a technique is now described according to one embodiment of the invention for finding a partition of an abstract quadrilateral mesh, independent of its representation. This independence allows our partition to be used, for instance, in finding isomorphisms between pairs of meshes. In this regard, two meshes will be isomorphic (e.g., in a comparison such as may be provided by comparison engine 160 of FIG. 1 or in step 235 of the method 200 of FIG. 2) if and only if their partitions are isomorphic, and, therefore, an isomorphism algorithm (e.g., as may be used by the comparison engine 160) can be applied directly on the schematic partitions of the meshes rather than on the original uncompressed meshes.

In one embodiment, the technique used to generate a compressed graph or partition is based on the motorcycle graph, e.g., a construction inspired by a video game in the 1982 Disney movie Tron and previously used in algorithms for constructing straight skeletons. In the movie, players ride "light cycles" that move horizontally and vertically within a playing field, leaving paths behind them that are visible as glowing walls. The object of the game is to force one's opponents to crash into these walls; when this happens, the player who crashes loses the game. The motorcycle graph for a system of moving particles in the plane is formed by moving each particle in a straight line at its initial velocity until it reaches a point that has previously been part of the track followed by one of the other particles; when this happens, it stops. The paths traced out by the particles in this system form a pseudoforest called a motorcycle graph.

Similarly, a motorcycle graph may be determined or generated for a quadrilateral mesh or CG model using the following process (and then this type of compressed graph may be used in similarity testing between two models). At each extraordinary vertex of the mesh, incident to d edges, place d particles, one moving outwards on each edge. Assign all particles equal velocities. Then, in a sequence of time steps, move each particle along the edge on which it is placed. When a particle reaches an ordinary interior vertex of the mesh, it continues in the next time step outwards from that vertex on the opposite edge at that vertex. However, when two oppositely-traveling particles meet, when a particle meets a vertex that has previously been traversed by itself or another particle, or when a particle meets a boundary vertex of the mesh, the traveling particle stops.

There may be several ways of determining what happens when particles that are not oppositely oriented meet simultaneously at a vertex. For example, if there are three or four particles that meet simultaneously in this way, they all stop. However, if exactly two particles meet perpendicularly at a vertex, the compression or partitioning technique may employ the "right-hand rule" familiar to American drivers at intersections with four-way stops: the particle on the left (that is, clockwise from the right angle formed by the two particles' tracks) stops, while the particle on the right (that is, counter-clockwise from the right angle) keeps going. Note that this rule depends on having an orientation on the mesh, which may be imposed as part of a definition of an abstract quadrilateral mesh.

Figure 6A:
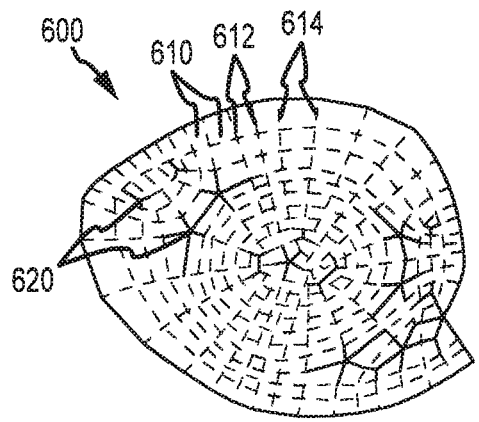
FIGS. 6A-6C illustrate construction of a motorcycle graph from a quadrilateral mesh version of a model or representation of an object.
Figure 6B:
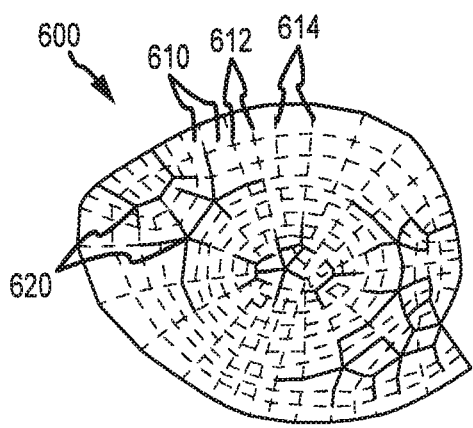
Figure 6C:
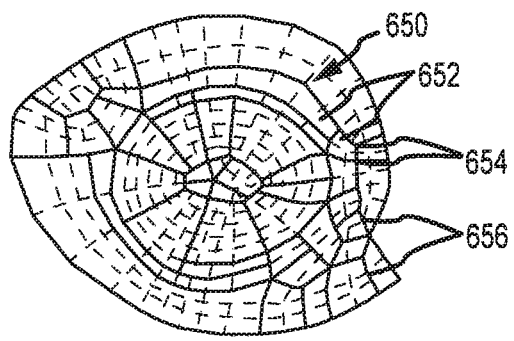

Eventually, all particles stop traveling. Each moving particle moves from a vertex that is not reused as the source of another moving particle, and, as a result, the process runs out of vertices from which particles can move. The motorcycle graph of the mesh includes the set of edges traversed by particles as part of this process, together with all boundary edges of the mesh. FIGS. 6A-6C show the process of motorcycle graph construction on an example mesh 600 formed of a plurality of faces or quadrilaterals, vertices 612, and edges 614. In FIG. 6A, the construction is shown after one time step with particles emanating from each extraordinary vertex 620 shown as moving one edge away from their initial positions. In FIG. 6B, the construction is shown after two time steps with some particles having collided with each other. In FIG. 6C, the completed motorcycle graph 650 is shown including its significantly reduced number of faces or quadrilaterals 652, vertices 654, and edges 656.

A first theorem (or Theorem 1) regarding motorcycle graphs may be stated as the motorcycle graph partitions any abstract quadrilateral mesh M into structured submeshes. If M is not itself structured, each of the submeshes is topologically equivalent to a disk. The motorcycle graph is determined uniquely by the connectivity of the mesh and does not depend on the computer representation of the mesh. For surfaces of bounded genus, the motorcycle graph partitions any mesh into a number of structured submeshes that is within a constant factor of the minimum possible. The numbers of vertices and edges of the corresponding schematic partition are also within a constant factor of the minimum possible. If M is given together with a list of the extraordinary vertices in M, then the motorcycle graph may be constructed in an amount of time that is proportional to the total number of edges in M that it contains.

As noted above, one motivating application was for creating compressed graphs or partitions such as the motorcycle graph was for use in testing the isomorphism of meshes. In that light, a second theorem (or Theorem 2) may be used to show that use of the motorcycle graph speeds up isomorphism calculations. In this second theorem, M and M' are taken to be quadrilateral meshes. Then M and M' are isomorphic if and only if the respective schematic partitions corresponding to the motorcycle graphs of M and M' are isomorphic as labeled, embedded multigraphs. Isomorphism between quadrilateral meshes on bounded-genus surfaces may be tested in linear time by constructing the motorcycle graphs and applying Miller's algorithm to the resulting schematic partitions (e.g., the graph comparison algorithm may be that developed by G. Miller, which is known to those skilled in the art and, hence, is not need repeated here but may be found in *Proc. 12<sup>th</sup> Annual ACM Symp. on Theory of Computing*, pages 225-235, 1980, article entitled "Isomorphism Testing for Graphs of Bounded Genus," which is incorporated herein by reference).

Although this result may not provide significant improvement in asymptotic complexity over direct application of Miller's algorithm to the original meshes, it does provide practical improvement in several ways. First, the only part of the algorithm in which the uncompressed representation of the input mesh is handled is as input for the construction of the motorcycle graph, which is much simpler than Miller's isomorphism testing algorithm and, as a result, likely has much smaller constant factors in its linear runtime. Second, if the extraordinary vertices are known, the whole algorithm may be performed in time sublinear in the input size. Third, the motorcycle graph construction need be performed only once for each mesh, allowing subsequent isomorphism tests to be performed efficiently on these compressed graphs for models.

In a test of the motorcycle graph partition (e.g., a compressed graph generator using a motorcycle graph module), the partition routine/technique was applied to six meshes created for a feature film animation application. The results showed: (a) Model A had 820 vertices and 1603 edges in the original mesh and 98 vertices and 123 edges in the motorcycle graph or schematic partition to provide a compression factor of about 12.0 percent for vertices and about 7.7 percent for edges; (b) Model B had 1070 vertices and 2110 edges in the original mesh and had 164 vertices and 247 edges in the schematic partition for a compression factor of about 15.3 percent for the vertices and 11.7 percent for the edges; (c) Model C had 3099 vertices and 6034 edges in the original mesh and had 286 vertices and 408 edges in the schematic partition for a compression factor of about 9.2 percent in the vertices and 6.8 percent in the edges; (d) Model D had 6982 vertices and 13933 edges in the original mesh and had 711 vertices and 1251 edges in the schematic partition for a compression factor of about 10.2 percent for vertices and 9.0 percent for edges; (e) Model E had 9958 vertices and 19889 edges in the original mesh and had 749 vertices and 1299 edges in the schematic partition for a compression factor of about 7.5 percent for vertices and 6.5 percent for edges; and (f) Model F had 10281 vertices and 20530 edges in the original mesh and had 761 vertices and 1300 edges in the schematic partition for a compression factor of about 7.4 percent for vertices and 6.3 percent for edges. Also, as discussed above, FIG. 3 illustrates a pair of models 310, 330 that may be processed using these compression techniques to form the motorcycle graphs 415, 425 based on the meshes of models 310, 330 as shown in FIG. 4. The reduction in size of the number of edges in the schematic partition (the controlling factor for the size of its winged-edge representation) compared to the number of edges in the original mesh ranged from 6.33% to 11.71%, with some trend towards better compression on larger meshes. The reduction in the number of vertices was similar although not quite so great. It is expected a similar reduction would be found in the time for performing isomorphism tests (such as Miller's algorithm or other similarity testing) on compressed meshes with respect to the times for testing their uncompressed counterparts, and perhaps, in this case, the speedup might be even larger due to the presence of labels in the schematic partition which may serve to help in isomorphism testing.

In some applications of structured partitions, it may be acceptable to spend a greater amount of preprocessing time and sacrifice canonicalness of the resulting partition. In this regard, several observations may be made related to minimizing the number of vertices in any schematic partition for a mesh M. First, each extraordinary vertex of the input mesh should be a vertex of the schematic partition. Second, at each extraordinary vertex, edges of the schematic partition should follow paths that use at least every other outgoing edge for, if two consecutive edges at the vertex remained unused, the result would be an extraordinary boundary vertex of degree four or greater in some submesh of the partition. Third, the motorcycle graph construction may be modified to produce a valid structured partition by allowing particles to travel at different velocities or with different starting times. The simultaneous movement of the particles is important in making the motorcycle graph canonical but not in generating a correct partition. Fourth, the schematic partition formed from a motorcycle graph includes as a vertex an ordinary vertex v of M only if some particle reaches v after some other particle has already reached it or if two particles reach v simultaneously.

Thus, a smaller partition than the motorcycle graph itself may be found in some cases by a process in which the partition is built up by adding a single path at a time, at each step starting from an extraordinary vertex and extending a path from it until it hits either another extraordinary vertex or an ordinary vertex that has previously been included in one of the paths. In this process, priority may be given first to paths that extend from one extraordinarily vertex to another because these paths cannot do not add any additional vertices to the partition. Secondly, paths may be preferred in the initial edge of which is an even number of positions from some other edge around the same extraordinary vertex in order to use as few paths emanating from that vertex as possible. Once no two consecutive edges at an extraordinary vertex remain unused, the partition process may terminate with a valid partition. The partition discussed above with 323 vertices, 622 edges, and 300 quadrilaterals in the original, mesh, for instance, may be constructed by a process of this type, and, for such a smaller mesh, this technique for creating a compressed version of the model is significantly simpler than the motorcycle graph partition of the same mesh.

An alternative approach to reducing the complexity of partitions into structured submeshes would be, instead, to form the motorcycle graph, and then to repeatedly merge pairs of structured submeshes, the union of which is still structured. For instance, the motorcycle graph 650 in FIG. 6C contains many mergable pairs of submeshes. This approach would not be able to find certain partitions, for instance those in which some instances of the right hand rule have been replaced by a symmetric left hand rule. So, it may be less effective at finding small partitions, but it would have the advantage of working within the compressed mesh after an initial motorcycle graph construction phase. Therefore, such an alternate compression technique could likely be implemented to run more efficiently than the careful selection of paths described above.

Note, some special cases of problems of finding optimal partitions may be solvable in polynomial time. For instance, a polygon in the plane with horizontal and vertical sides (possibly with holes) may be partitioned into the minimum possible number of rectangles, in polynomial time. The same algorithm may be adapted to find a partition of a mesh having only axis-aligned rectangles into a minimum number of structured submeshes, again in polynomial time. However, this method typically does not minimize the number of vertices and edges of a schematic partition for the mesh and likely may only be applied, to a very restricted subset of quadrilateral meshes.

In order to show that finding optimal structured partitions is hard, the problem of finding an optimal structured partition is modeled as a decision problem. Three such problems may be defined, one for each parameter measuring the size of a partition, and, then, it can be shown that they are all NP-complete. Specifically, a third theorem (or Theorem 3) may be stated as follows. It is NP-complete to determine, for a given mesh M and parameter k, whether there exists a partition of M into at most k structured submeshes, which there exists a partition of M into structured submeshes that corresponds to a schematic partition with at most k vertices, or whether there exists a partition of M into structured submeshes that corresponds to a schematic partition with at most k edges. The proof may be completed by a reduction from maximum independent sets in cubic planar graphs, via an intermediate problem, which can also be shown to be NP-complete with finding a maximum independent set in the instruction graph of a family of line segments such that any two intersecting segments in the family cross properly.

To summarize some of this discussion of creating a compressed graph in the form of a motorcycle graph, a number of problems were investigated and solved that involved canonical and optimal partitioning of unstructured quadrilateral meshes into structured meshes. The motorcycle graph approximates the optimal structured partition to within a constant factor in the number of vertices, edges, and submeshes. The constant factor that the inventors have been able to prove is relatively large, but it is likely that further efforts by those skilled in the art will prove or provide tighter bounds on its quality or on the quality of the improved mesh partitioning strategies that were described based on sequential choices of paths giving priority to paths that connect pairs of extraordinary, vertices. The proof that optimal partitioning problems are hard relies on meshes with a very large number of boundary components, and accordingly high genus, but in some cases, these problems may also be hard for bounded-genus meshes. In addition, it may be of interest to gather more empirical data on the application of our structured partition techniques to the problems described above. In brief, the inventors have implemented an exact mesh isomorphism strategy based on the motorcycle graph, and the results are very promising for use in compressing data storage needs and for facilitating comparison of two models based on their compressed graphs and then when at least partially isomorphism is found transferring attributes or data from one model to the other (e.g., from a source model to a target model).

With a solid understanding of mesh compression using motorcycle graph processes in hand, it may now be useful to explain other compression techniques (e.g., skeleton graph techniques) and other processing useful for performing similarity testing (e.g., identifying anchor vertices). Before turning to such details, a reminder that quadrilateral meshes are used to model objects and characters as representing polyhedral surfaces such that each face is a quadrilateral. Having each face a quadrilateral is useful in part because quadrilaterals or quads can be easily partitioned into finer quadrilateral grids, which facilitates applications such as refining a low-resolution texture image mapped to a single quad into a high-resolution image mapped into a grid of refined sub-quads in that single quad. In order to better utilize the time of people such as animators working with a given quad mesh or CG model, it is common for a single mesh to be used in a number of different processing paths in parallel.

As discussed above, a signal mesh may be processed simultaneously for texture mapping, feature mapping, finite element analysis for physical animation purposes, and morphing for object animation. Unfortunately, the software systems that perform the multiple simultaneous tasks on a given mesh M often use different internal representations of M, which in turn can result in different representations of mesh M in the output of each task, e.g., reordering or reindexing of vertices of the mesh M while keeping the topological structure of mesh M unchanged or computation al tasks may slightly change the structure in hard to identify places. Thus, in order to integrate the results of a set of multiple parallel tasks performed on a mesh M, it is desirable to match or perform similarity testing as well as possible on all the copies or versions of a particular model or mesh M. Such matching or determination that all or portions of two models are similar in connectivity allows that attributes such as texturing and feature mapping can be transferred from one model to another. When quad meshes (or their compressed graphs or embedded graphs) are not fully identical with regard to topological connectivity, it is desirable to solve the approximate topological matching problem as to identify much of the matching portion and to identify the nonmatching regions or portions of the model (which may include at least some regions that have similar topological connectivity).

In the following paragraphs, the problem and possible solutions are described for how to find a best match between two potentially dissimilar quadrilateral meshes (e.g., two models that are similar but include one or more regions of nonmatching topological connectivity). Such algorithms and techniques may be implemented by the attribute transfer module 150 of FIG. 1 such as in the skeleton graph module 158, the graph comparison engine 160, the approximate topological matching algorithm 162, and the anchor vertices ID algorithm 163 (as well as the method 200 of FIG. 2 when topological connectivity similarity is not found at 235). In brief the describe results indicate that the problem of finding the best match is NP-hard or nearly impossible (if "best" is most matching vertices), implying that it is very unlikely that there is a polynomial-time algorithm for approximate topological matching. Of course, there is a polynomial-time solution for finding an exact topological match between two meshes if such a match exists, but the quadratic running time of such an algorithm makes its use impractical for most real world meshes with more than a few hundred quads (and for most computing applications). Moreover, because most of the vertices in a quadrilateral mesh have degree four, there is a considerable amount of natural similarity and symmetry between quad meshes, which makes even the exact matching problem interesting or challenging in practice.

In some of the following embodiments, a heuristic algorithm is provided for use in approximating topological mesh matching (e.g., for use in matching algorithm 162 of FIG. 1). The heuristic algorithm is, at least in part, based on a graph-theoretic analogue to the Delaunay triangulation. A Delaunay triangulation may be defined on a set of points S in the plane as the graphtheoretic dual of a Voronoi diagram of S. If we imagine that the plane is made of a combustible materials, and a fire is started from each point in S and the propagation of the waves of the fire are watched, then the Delaunay triangulation is the graph defined by joining every pair of points whose waves of fire crash into each other. Different versions of the Delaunay triangulation may be produced depending on the shape of the fire waves (e.g., as defined by uniform-distance balls determined by $L_1$, $L_2$, or $L_\infty$ metrics). This approach may be applied to quad meshes in embodiments of the invention, viewing the vertices of degree four as "combustible material" and the extraordinary vertices of degree other than four as the starting points for the fires. Such a fire propagation approach to defining a graph-theoretic Delaunay triangulation has, in some cases an undesirable complication for approximation matching. It can lead to poor matches when a deformed portion of the mesh is shrunk relative to a portion it should be approximately matched against. However, the fire-growing approach described herein for use in approximate matching can be made to work effectively even in these more difficult cases as long as the wave fronts are grown in a lazy-greedy fashion, which is one preferred embodiment of the approximate topological matching algorithm of the invention, so as to grow the largest portions of matching wave fronts.

Before discussing specific algorithms and results, it may be helpful to discuss and describe terms and general information about quadrilateral meshes (or assumptions made by the inventors). Any graph drawn on the sphere $S_0$ in three-dimensional space partitions the surface of $S_0$ into cells such that each is homeomorphic to a disk (e.g., it is assumed that graphs are drawn without edge crossings). Each such cell is called a face in the embedding, and adding g "handles" to $S_0$ gives the surface $S_g$, which is said to have genus g. For example, a traditional coffee cup is of genus 1.

A cellular embedding of a graph on $S_g$ is a drawing that partitions $S_g$ into cells such that each is homeomorphic to a disk. A quadrilateral mesh is a cellular embedding of a graph G=(V, E) onto a surface $S_g$ such that each face is a quadrilateral. The genus of the mesh is g in this case. A quad mesh may be viewed as a triple (V, E, Q) where V is a set of vertices, E is a set of edges, and Q is a set of quadrilaterals. In addition, quad meshes are represented with a data structure, such as a "winged edge" structure (e.g., a winged-edge polyhedron representation such as described by B. G. Baumgart in Technical Report CS-TR-72-320, Stanford University, 1972, which is incorporated herein by reference), that supports the following operations: (a) list the incident edges around a given vertex (in clockwise or counter-clockwise order) in time proportional to the degree of that vertex; (b) list the bounding edges around a given face (in clockwise or counter-clockwise order) in time proportional to the size of that face; and (c) list the two vertices that are the endpoints of a given edge in constant time.

The simplest form of quad mesh is a structured mesh, where every vertex has degree four. The average degree of vertices in a bounded-genus quad mesh is 4, and it is common for the majority of vertices in a quad mesh to have degree 4. For this reason, if a vertex in a quad mesh is an interior vertex with degree different than 4 or an exterior (boundary) vertex with degree different than 3, then that vertex is referred to as an extraordinary vertex. Regarding the size of a quad mesh, traditionally, an algorithm operating on a graph G is characterized in terms of n=|V|, the number of vertices of (G, and m=|E|, the number of edges in G. These measures are present in quad mesh algorithms as well, but there is also q=|Q|, the number of quads, so it is useful to relate these quantities. Hence, a first observation (or Observation 1) may be that in a quad mesh with m edges and q faces, $2q \leq m \leq 4q$. A proof of such an observation may be that if the number of edges on every face is summed up each edge is counted at least once and at most twice. Since each face is a quadrilateral, $4q \leq 2m$ and $m \leq 4q$.

A second observation (or Observation 2) may be that the number of edges and faces in a quad mesh can be arbitrarily larger than the number of vertices. Proof of such an observation is that two vertices can be placed at opposite poles of a sphere and as many edges as liked can be added joining them. Now, remove the sphere and enlarge each edge to be a thin tube. Next, take each original vertex and split into two points separated by the width of a tube, with one on top and one on the bottom. Now, for each tube, run an edge between the two top vertices, an edge between the two bottom vertices, and an edge joining top to bottom at each pole. This creates a quad mesh with four vertices and an arbitrary number of faces and edges.

Although it is not uncommon in the solid modeling literature to allow for such multiple edges and even self loops in the graph defined by a quadrilateral mesh, the following description is generally limited to simple meshes, where there are no multiple edges between the same pair of vertices and no self loops. Likewise, multiple edges and self loops are disallowed in the dual graph, which is formed by placing a vertex in each quad and joining two quads Q and R with an edge any time Q and R have an edge of the mesh in common. Likewise, the mesh is well-formed, meaning that it satisfy the following: (a) for each vertex v, the set of quads containing v is connected in the dual graph; (b) the boundary of a quadrilateral mesh M includes all edges of E that belong to exactly one quadrilateral in M and all vertices incident to an edge of this type (also, for every cyclic portion C of the boundary of M on $S_g$ (that is, a "hole" in the mesh), the interior of C is homeomorphic to a disk, which may be stated that each hole in M is contractible); (c) every edge in M is adjacent to at least one and at most two quadrilateral faces of M; and (d) any two quadrilaterals in Q intersect in a single edge, a single vertex, or the empty set.

A third observation (or Observation 3) may be stated that in a simple, connected, well-formed quadrilateral mesh M of genus g, with n vertices and m edges, $m \leq 2+4g-4$. Proof for such observation is that since M is a simple, cellularly embedded graph in g, the Euler characteristic implies: n−m+q=2−2g. Specifically, the Euler characteristic (which is also called "Euler's formula" or the "Euler-Poincare characteristic") states that, in such embeddings, the number of vertices minus the number of edges plus the number of faces is equal to 2−2g. That is, in this case, m=n+q+2g−2. Based on the first observation discussed above (or Observation 1), $q \leq m/2$ and thus, $m \leq 2n+4g-4$.

In most practical applications of quadrilateral meshes, the genus g of a given mesh is bounded by constant, and it is likely O(n). In fact, g is typically 0 or 1. Thus, the above lemma implies that in almost every practical application using a mesh M with n vertices and m edges, m is O(n). Thus, for example, the time complexity of the simple wave-growing exact graph isomorphism algorithm on such meshes is $O(n^2)$. The following lemma may be stated, too. In a simple, connected, well-formed quadrilateral mesh M of genus g, with n vertices and m edges: $m \leq ((4/3g)^{1/2}+2)n-4$. The proof of this lemma follows from observation 3 (or Observation 3) in that it is known that: $m \leq 2n+4g-4$. So, proof requires that it is shown that $4g \leq (4/3g)^{1/2}n$ or to show $g < n^2/12$. But, this follows from the fact that M is simple and the complete graph on n vertices $K_n$, has genus less than $n^2/12$.

As method above, the problem of finding a best approximate topological match between two quad meshes has several uses in object representation and rendering applications. Unfortunately, as will be shown in the following discussion, the problem of finding an optimal approximate topological match is typically NP-hard and algorithms trying to find such an optimal match are not useful in practice. In order to be precise, the approximate topological matching problem for quad meshes should be stated more formally. Given two quadrilateral meshes, $M_1$ and $M_2$. A matching submesh $S_1$ of $M_1$, with respect to $M_2$, is a connected set of quads in $M_1$ that is mapped one-to-one to a connected set of quads in $M_2$ by a function µ that maps quads in $S_1$ to quads in $M_2$ such that $q_1$ and $q_2$ are adjacent in $S_1$ if and only in $\mu(q_1)$ and $\mu(q_2)$ are adjacent in $M_2$ (using adjacency across edge boundaries). The approximate topological matching problem is to find a matching submesh $S_1$ of $M_1$, with respect to $M_2$, and corresponding mapping function µ, such that $S_1$ has the largest number of quads over all such submeshes.

Unfortunately, we have the following theorem (or Theorem 5) that the approximate topological matching problem for quad meshes in NP-hard. Proof of this theorem involves showing that this problem is NP-hard by giving a reduction from the problem of determining if a given cubic planar graph is Hamiltonian, which is known to be NP-complete. Suppose then, a cubic planar graph G is given as input, that is a graph G such that each vertex has degree 3 and which can be drawn in the plane without crossings. An embedding of G can be produced in an O(n)×O(n) integer grid in polynomial time, where n is the number of vertices in G. Next, C may assumed to be a simple cycle with n vertices, and a mesh $M_1$ can be constructed from C by expanding each edge of C into a connected sequence of four quads and expanding each vertex of C according to a replacement mesh. Then, G may be converted into a second quad mesh $M_2$ by expanding each edge into a sequence of four quads "glued" together end-to-end and expanding each vertex of G according to another replacement mesh (e.g., replacement meshes in which all the possible ways that a maximum number of quads in a vertex submesh from $M_1$ can match a maximum number of quads in the vertex submesh in $M_2$ is considered). Note that since each edge in G and C is expanded into a connected sequence of 4 quads, the quads in an edge submesh can match at most 2 quads in a vertex submesh. Now suppose that G is Hamiltonian. That is, C is a subgraph of G. Then, there is a topological match of $M_1$ in $M_2$ that pairs up all but n quads from $M_1$, i.e., the number of matched quads between $M_1$ in $M_2$ is 7n. Suppose, on the other hand, that there is a match of $M_1$ in $M_2$ that matches 7n quads. As we have noted above, the only way this can occur is if the edge submeshes of $M_1$ match edge submeshes of $M_2$ and 3 quads in each vertex submesh of the $M_1$ match inside a vertex submesh of $M_2$. Thus, C is a subgraph of G, e.g., G is Hamiltonian.

Turning now to features or aspects of the present invention as discussed with reference to FIGS. 1 and 2, given that the approximate topological matching problem is NP-hard, it is very unlikely that there is an efficient algorithm for solving it exactly. Thus, let us discuss a heuristic approach that may be used in the approximate topological matching algorithm 162 with support by anchor vertices ID algorithm 163 of FIG. 1 (and steps 270, 280, 290 of method 200 of FIG. 2).

A useful starting point for our heuristic algorithm may include the identification of good anchors that can seed the process of matching pairs of quads in the input meshes $M_1$ in $M_2$ (e.g., the models to be compared for similar connectivity). In order to find a good set of anchors, a few iterations of the Weisfeiler and Leman (WL) algorithm may be applied for exact graph isomorphism (e.g., see, M. Grohe, "Isomorphism Testing for Embeddable Graphs Through Definability" found at least in STOC '00: Proceedings of the $32^{nd}$ Annual ACM Symposium on Theory of Computing, pages 63-72, New York, N.Y., USA, 2000, ACM Press, which is incorporated herein by reference). As will be understood by those skilled in the art, in the WL algorithm, each vertex is initially colored with a color associated with its degree (e.g., not only the degree of each vertex may serve as the seed for colors as the edge weights may also be chosen for use in the compressed meshes, and, in order to do so, each edge may be labeled by the number of edges contracted while compressing the meshes). Then, each vertex is colored by a string of its neighbors' colors in an order that appears in the topological embedding. In turning the cyclic ordering into a linear ordering, the one that is lexicographically minimum is picked or selected. Then, these strings are allowed to be the new colors of the vertices, which can be re-normalized to be the integers from 1 to n with a simple radix sort. The following algorithm (or Algorithm 1) gives a pseudo code for this procedure:

---
Algorithm 1: Algorithm for ColorGraph
---
foreach u ∈ M do
    tmpColor[u] = deg(u);
end
foreach u ∈ M do
    Color[u] = ( );

---
Algorithm 1: Algorithm for ColorGraph
---
    foreach v ∈ neighbor(u) do
        Color[u] = Color[u] + tmpColor[v];
    end
    Color[u] = Lexicographical minimum ordering of Color[u];
end
return the set of vertices with unique color;

Observe that the second loop in Algorithm 1 can be repeated to refine the colors of vertices. This repetition should be done until a reasonable stopping condition is reached. For example, the stopping condition may be used of repeating until a set upper bound, k, is reached on the number of iterations or until at least one pair of uniquely colored edges are found, one from each mesh. If this loop is repeated i times, the color of each vertex u will contain information about the vertices that are within distance i from u. The running time of this second loop is 2m=O(m), which is O(n) in the case of planar meshes or meshes of at most linear genus, by Observation 3 described above. A final step of the algorithm for identifying seeds to initiate mesh-matching growth from is that of finding corresponding anchors from the colored compressed meshes. In order to find such seeds, the rarest (hopefully unique) colored vertices returned from the two compressed meshes are first matched, and then look for matching neighbors of the two matched vertices. Again, for most meshes, this process takes O(n) time in the worst case, by Observation 3 or Lemma 4 described above.

This WL algorithm or Algorithm 1 may also be considered looking for or identifying unique labels as discussed with reference to FIGS. 1 and 2 to identify good anchor vertices. For example, each of the vertices in a mesh may be labeled using the number of edges emanating from that vertex. Then, in a second iteration, a concatenation of the labels of all a vertex's neighbors may be performed. Then, the smallest number (or another value) among these possible concatenations may be chosen. If we have a unique number among these selected smallest numbers then the process may continue with finding a match in the other model or mesh. If a match is found in the second model or mesh, one of the neighbors of these vertices may be chosen to create a good starting pair of vertices or anchors for later processing such as for use in the heuristic algorithm described below (e.g., in the approximate topological matching algorithm).

As noted above, it is desirable to find rare or even uniquely-colored anchors, so as to limit the number of possible candidate starting points for growing matching sets of quads between the two input meshes. Thus, it makes intuitive sense that the search should concentrate on extraordinary vertices. In order to focus on the adjacencies between these vertices, a compression scheme may be applied that focuses on extraordinary vertices, and, in most cases, a scheme that reduces the size of the graph to be processed. Hence, some embodiments of the invention utilize a skeleton graph module (e.g., element 158 of FIG. 1) or algorithm to create a compressed graph. Constructing a compressed skeleton graph inside each mesh may be preformed or thought of in the following way. Imagine that a particle is shot outward in every possible direction going out of each extraordinary vertex. These particles (separately) trace out a subgraph in each input mesh, $M_1$ in $M_2$. The particles are allowed to continue to move, tracing out the compressed graph for use in color assignment, until each such particle reaches another extraordinary vertex (which is a very common occurrence given the way that people build quad meshes in practice) or the particle reaches a boundary edge. In some cases, the creation of the anchor skeleton version of a compressed graph is followed by the anchor-finding procedure, e.g., the anchor finding algorithm or similar ID process for starting vertices is performed on this skeleton graph.

Before describing an embodiment of an approximate topological matching algorithm, it may be useful to describe a false start or exact/best match process that is ineffective, e.g., a greedy algorithm. For example, given a set of anchors to begin a matching or graph comparison process, perhaps the most natural heuristic algorithm for solving the approximate topological matching problem is to start with a seed pair of matching quads, starting at some candidate anchors, and grow out matching meshes from this starting point. The natural greedy algorithm based on this approach would be to grow out the matching set of quads in waves, adding as many quads as possible so as to satisfy the adjacency constraint for quads (e.g., by restricting attention to quads that are adjacent across an edge or vertex).

Unfortunately, this greedy approach suffers from a serious drawback, which is highlighted by a simple example. Suppose we are given two similar meshes, $M_1$ in $M_2$, such that $M_2$ is an exact match for $M_1$ except that some small group of quads in $M_2$ is compressed into a set of edges. Suppose further that sets of matching quads are grown out in $M_1$ in $M_2$ starting from some anchor point, using the greedy approach of matching as many quads as possible with wavefront propagation. When this propagating wavefront reaches the set of compressed quads (or nonmatching regions), it will correctly match long sets of quads on each side of the mismatching portion, but the process will also incorrectly match as many quads as possible across the compressed edges as well. Unfortunately, this sets off a cascading failure, as the wavefront that propagated across the compressed edges will be out of phase with the (correct) sets of quads that are being matched as they go around the compressed region. The cascade continues because the incorrectly-matched quads are being "grown" ahead of the correctly-matching quads (e.g., the matching regions behind the mismatching region are identified falsely as also being mismatching due to the growth or propagation of the wavefront). The correctly-matching quads never have a chance to "catch up" to this wave, however, and it can continue cascading across the entire mesh. Thus, a greedy algorithm may be used as a heuristic for solving the approximate topological matching problem, but it often will result in identifying large areas or regions as nonmatching that actually have similar topological connection. Hence, most embodiments of the invention utilize a lazy-greedy approach for approximate topological matching (e.g., comparison when two models are not identical), while the greedy approach may be used as an initial mesh comparison process/algorithm (e.g., by graph comparison engine 160 of FIG. 1 or in step 235 of the method 200 of FIG. 2 to determine whether or not two meshes are identical).

More particularly, the following description discusses one useful lazy-greedy approach to solving the approximate topological matching problem for two quad meshes by using a wavefront "fire-propagation" method. A main idea behind this oxymoronic algorithm is to grow out waves of matching quads, as in the greedy algorithm given above as a false start but to do so in a more relaxed way that helps to avoid the cascading failures that can arise from the straightforward greedy algorithm. Assume then that an initial coloring or other process has been performed to find and/or identify a set of anchors to begin the matching process from in $M_1$ in $M_2$. The goal of the lazy-greedy algorithm is to incrementally build a mapping function, $\mu$, that matches quads in $M_1$ to quads in $M_2$. Initially, $\mu$ maps the two anchor quads in $M_1$ in $M_2$ to each other (defining an edge in the dual graph). As the matching proceeds, the set of quads are tracked where the matching function $\mu$ can expand to more quads. Let S be the set of currently matched quads, that is, each quad q in $M_1$ for which a matching quad, $\mu(q)$ has been determined. Since the process starts matching from a seed, at each iteration, S forms a contiguous block of quads in $M_1$ with a corresponding set of matching quads, $\mu(S)$ in $M_2$. Now, let S' be a subset of quads in S on the boundary of the contiguous submesh S, that is, quads that have adjacent unmatched neighbors. When growing the match at each iteration, note that it is only necessary to consider quads that are either vertex or edge adjacent to quads in S' or $\mu(S')$, since the quads that are interior to the contiguous block have no adjacent unmatched quads.

Let A be the set of unmatched quads in $M_1$ that are vertex or edge adjacent to quads in S', and let B be the set of unmatched quads in $M_2$ that are vertex or edge adjacent to quads in S'. For each quad q in A, let M(q) be the set of quads in B that could match with q, that is, each quad r in B such that r is adjacent to a quad $\mu(t)$ such that q is adjacent to t in the same way as r and $\mu(t)$ (i.e., across a corresponding vertex or edge adjacency). Now, create a compatibility graph L by defining, for each M(q), a vertex $v_{i,q}$ for each quad in M(q). Note that same quad in B might be listed in different M(q) sets, in which case a different vertex in L may be created for each copy of the quad in the different M(q) sets. A vertex $v_{i,q}$ is adjacent to vertex $v_{i,s}$ in L if: (a) q and s are adjacent across an edge in $M_1$; and (b) the quads, r and t, corresponding respectively to $v_{i,s}$ are compatible in $M_2$, meaning that if $\mu$ were extended by mapping q to r and s to t, then the submesh in $M_1$ consisting of q and s and all their adjacent quads in S' would be consistent (in the topological sense) with the submesh in $M_2$ consisting of r and t and all their adjacent quads in $\mu(S')$. Note, the nodes in L have degree at most 2.

The lazy-greedy heuristic is to extend $\mu$ in each iteration by adding the matches defined by a longest path in L. Note, this is a greedy algorithm in the sense that it is augmenting the match using an optimization criterion that maximizes an objective function. But it is also a lazy algorithm in that it postpones performing a lot of potentially valid matches between quads in $M_1$ in $M_2$ just because they did not belong to the longest path in the compatibility graph L. The lazy-greedy heuristic process is repeated until the current version of L contains no vertices.

A benefit of the lazy-greedy approach is that it allows the approximate matching process to match the quads around a small mismatching region even when the mismatch is caused by a compression of quads into individual edges. Such a compression causes the greedy algorithm to immediately march through these bad regions, whereas the lazy-greedy algorithm will only venture into such regions as a last resort.

The lazy greedy algorithm or approach to approximate matching or similarity testing has been empirically tested on real-world quad meshes from a character database for an animation project. A first assertion tested was that the compressed graph generated by with the described skeleton graph algorithm significantly compresses quad meshes in a way that preserves essential features. The following example results were achieved: (a) for a model of a bear character with 1070 vertices and 2110 edges in the original mesh the skeleton graph had 202 vertices and 393 edges for reduction or compression of 81 percent; (b) for a model of a shirt with 3099 vertices and 6134 edges in the original mesh the skeleton graph had 518 vertices and 1015 edges for a reduction of 83 percent; and (c) in a model of a body with 6976 vertices and 13903 edges in the original mesh the skeleton graph had 2340 vertices and 4647 edges for a reduction of 66 percent. In these tests, the reduction percentages or compression factors averaged around 75 percent.

A significant aspect of this compression may not be the storage savings (although the compression technique could be used for that purpose) since the regions bounded by edges of the skeleton graph are all structured meshes. Instead, these compressed graphs in the form of skeleton graphs are very useful to facilitate approximate matching processes. With this in mind, another assertion or aspect of the invention that was tested was that the lazy-greedy algorithm runs fast enough for most interactive modeling purposes. The running times for the matching process (or the approximate topological matching algorithm) were determined for the same models tested for compression effectiveness. Exemplary results include: (a) for the bear model the matching time was 0.04 seconds; (b) for the shirt model the running time for approximate topological matching was 0.12 seconds; and (c) for the body model the running time was 1.08 seconds. The running times for approximate matching were found generally to be at a second or less, which is sufficient for most if not all interactive modeling purposes. Moreover, it significantly speeds up prior processes that involved human input of a pair of edges to use as anchors, with some suggested embodiments using an algorithm to determine anchors for starting points in a matching process between two models.

Additionally, it is likely that the use of the lazy-greedy algorithm will produce or find good approximate matches (e.g., identify larger matching regions and also, in some embodiments, identify the nonmatching or mismatched/changed regions to facilitate manual transfer of attributes between just those nonmatching portions of models). In testing, it was proven that the lazy-greedy algorithm was successful in many cases (such as can be seen by the results shown in FIGS. 3, 5A, and 5B which provide an identification of nonmatching regions with large portions of the models found to be matched such as with approximate topological matching). In a more theoretical sense, there may be a mapping between two simple, connected, well-formed quad meshes $M_1$ in $M_2$ such that each connected mismatched region has boundary complexity of at most 6. Suppose further that the medial axis of the matched region for $M_1$ in $M_2$ is connected and has a spanning three T such that each edge of T has a cross-sectional width of at least $\epsilon > 2\delta$. Then the lazy-greedy algorithm succeeds in finding a match at least as good as this match. In addition, a subjective evaluation of the matches the algorithms described herein produced on a representative character database demonstrated to the inventors that the algorithms empirically found good matches. For example, the quality of the matches produced by the algorithms on the bears and the body described above in the compression results and run times above and the body can be seen in FIGS. 3-5B.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A computer-based method for transferring attributes between polygonal models based on topological connectivity, comprising:

storing a first model and a second model in memory, wherein the first and second models each comprises a polygonal mesh, and the memory further stores a set of attributes for at least the first model;

with a processor of a computer, determining a feature in each of the polygonal meshes of the first and second models;

with the processor, comparing topological connectivity of the first and second models using the features as a starting location;

when the compared topological connectivity is identical, transferring at least a portion of the set of attributes for the first model to the second model; and determining a pair of vertices in the first model matching a pair of vertices in the second model, wherein the pairs of vertices are the features used as the starting locations for the comparing of the topological connectivity of the polygonal meshes corresponding to the first and second models and wherein the comparing is performed using the polygonal meshes by working outward to neighboring vertices from the pairs of vertices to determine if connectivity is similar in the first and second models.

2. The method of claim 1, further comprising with the processor, operating a compressed graph generator to process the first and second models to generate first and second compressed graphs comprising compressed versions of the first and second models, wherein the comparing of the topological connectivity is performed on the first and second compressed graphs.

3. The method of claim 2, wherein the first and second compressed graphs each comprise a number of vertices that is less than 50 percent of a number of vertices in the polygonal meshes associated with the first and second models.

4. The method of claim 2, wherein the compressed graphs comprise a skeleton graph or a motorcycle graph.

5. The method of claim 2, wherein the pairs of vertices are used as starting locations for the comparing of the topological connectivity of the first and second compressed graphs.

6. The method of claim 5, wherein the determining of the pairs of vertices comprises labeling the vertices of first and second compressed graphs generated from the first and second models, selecting a uniquely labeled one of the vertices in the first compressed graph, and finding a matching one of the labeled vertices in the second compressed graph.

7. A computer-based method for transferring attributes between polygonal models based on topological connectivity, comprising:

storing a first model and a second model in memory, wherein the first and second models each comprise a polygonal mesh, and the memory further stores a set of attributes for at least the first model;

with a processor of a computer, determining a feature in each of the polygonal meshes of the first and second models;

with the processor, comparing topological connectivity of the first and second models using the features as a starting location;

when the compared topological connectivity is similar or identical, transferring at least a portion of the set of attributes for the first model to the second model; and when the compared topological connectivity is at least partially dissimilar, processing the first and second models to generate skeleton graphs and using the pairs of vertices applying a lazy-greedy algorithm to perform approximate topological matching of the first and second models.

8. The method of claim 7, wherein the output of the approximate topological matching comprises a set of regions in the first and second models with matching topological connectivity and a set of regions in the first and second models with nonmatching topological connectivity.

9. The method of claim 8, further comprising transferring at least a portion of the set of attributes associated with the set of matching regions of the first model to the second model.

10. A non-transitory computer readable medium storing code when executed by a processor processes computer generated models, comprising:
    computer readable program code devices configured to cause a computer to effect retrieving first and second meshes from memory for first and second models, respectively;
    computer readable program code devices configured to cause the computer to effect generating compressed graphs of the first and second meshes, wherein the compressed graphs each comprises a polygonal mesh defined by a plurality of interconnected vertices;
    computer readable program code devices configured to cause the computer to effect identifying a pair of vertices in the compressed graph of the first mesh that matches a pair of vertices in the compressed graph of the second mesh; and
    computer readable program code device configured to cause the computer to effect comparing topological connectivity of the compressed graphs starting at and working outward from the pairs of vertices in the polygonal meshes to identify regions in the compressed graphs with matching connectivity.

11. The computer readable medium of claim 10, further including computer readable program code device configured to cause the computer to effect transferring attributes from one of the first and second models to another one of the first and second models, the attributes being associated with the regions identified as having the matching connectivity.

12. The computer readable medium of claim 10, wherein the compressed graphs comprise motorcycle graph representations of the first and second meshes.

13. The computer readable medium of claim 10, wherein the compressed graphs comprise skeleton graph representations of the first and second meshes and wherein the comparing of the topological connectivity further comprises identifying regions in the compressed graphs with dissimilarity in the topological connectivity.

14. A method for transferring attributes associated with a first computer generated model to a second computer generated model, comprising:
    generating compressed versions of the first and second models, each of the compressed versions comprising a polygonal mesh;
    identifying anchors in the compressed versions of the first and second models;
    determining isomorphic portions of the first and second models using the identified anchors as starting locations, wherein the determining of the isomorphic portions is performed directly on the polygonal meshes of the compressed versions of the first and second models beginning at the identified anchors; and
    transferring attributes associated with the isomorphic portions of the first model to corresponding ones of the isomorphic portions of the second model,
    wherein the generating of the compressed versions comprises forming skeleton graphs from the polygonal meshes, and
    wherein the determining of the isomorphic portions comprises performing a lazy-greedy matching algorithm on the skeleton graphs from the identified anchors to determine the isomorphic portions and to identify non-isomorphic portions of the first and second models.

15. The method of claim 14, wherein the forming of the skeleton graphs comprises shooting outward a particle in all possible directions from each extraordinary vertex of the polygonal meshes to trace out a subgraph until each of the particles reaches another of the extraordinary vertices or the particles reaches a boundary edge of the polygonal mesh.

16. A method for transferring attributes associated with a first computer generated model to a second computer generated model, comprising:
    identifying anchors in the compressed versions of the first and second models;
    determining isomorphic portions of the first and second models;
    transferring attributes associated with the isomorphic portions of the first model to corresponding ones of the isomorphic portions of the second model; and
    generating compressed versions of the first and second models,
    wherein the determining of the isomorphic portions is performed on the compressed versions of the first and second models,
    wherein the generating of the compressed versions comprises forming skeleton graphs from polygonal meshes representing the first and second models, and
    wherein the determining of the isomorphic portions comprises performing a lazy-greedy matching algorithm on the skeleton graphs from the anchors to determine the isomorphic portions and also to identify non-isomorphic portions of the first and second models.

17. The method of claim 14, wherein the identifying of the anchors comprises labeling vertices of the first and second models, selecting a uniquely labeled one of the vertices in the first model, and finding a matching one of the labeled vertices in the second model.

* * * * *